March 8, 1966  H. E. RIORDAN  3,238,787
ANGULAR ACCELEROMETER EQUIPPED WITH MERCURY FILLED ROTOR
Filed Dec. 1, 1960  3 Sheets-Sheet 1

HUGH E. RIORDAN
INVENTOR.

BY
ATTORNEYS

March 8, 1966  H. E. RIORDAN  3,238,787
ANGULAR ACCELEROMETER EQUIPPED WITH MERCURY FILLED ROTOR
Filed Dec. 1, 1960  3 Sheets-Sheet 2
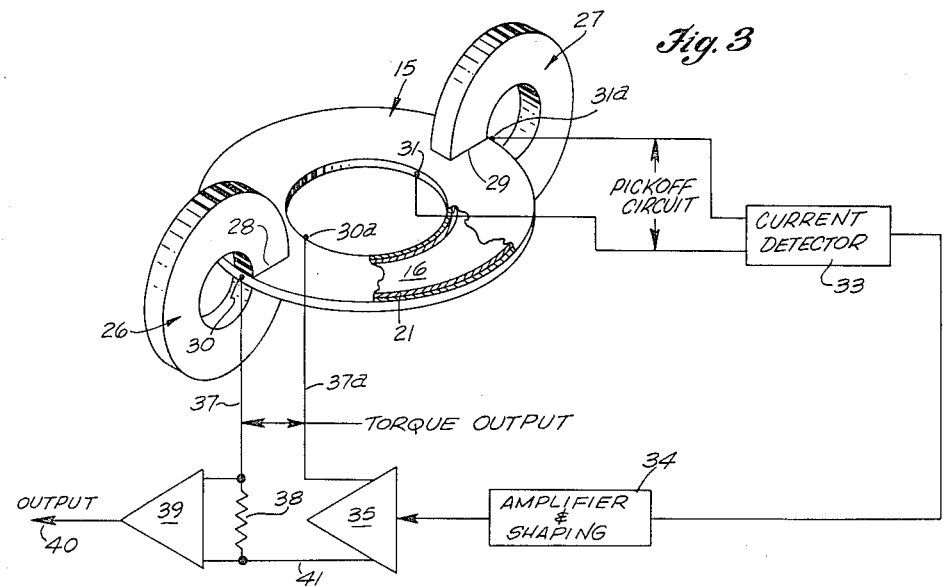
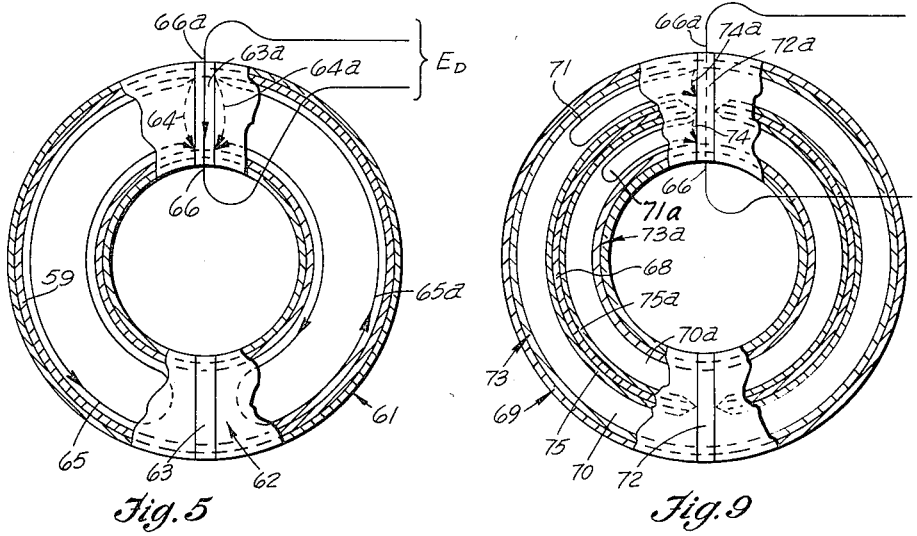
HUGH E. RIORDAN
INVENTOR.
BY Andrew L. Bain
ATTORNEYS

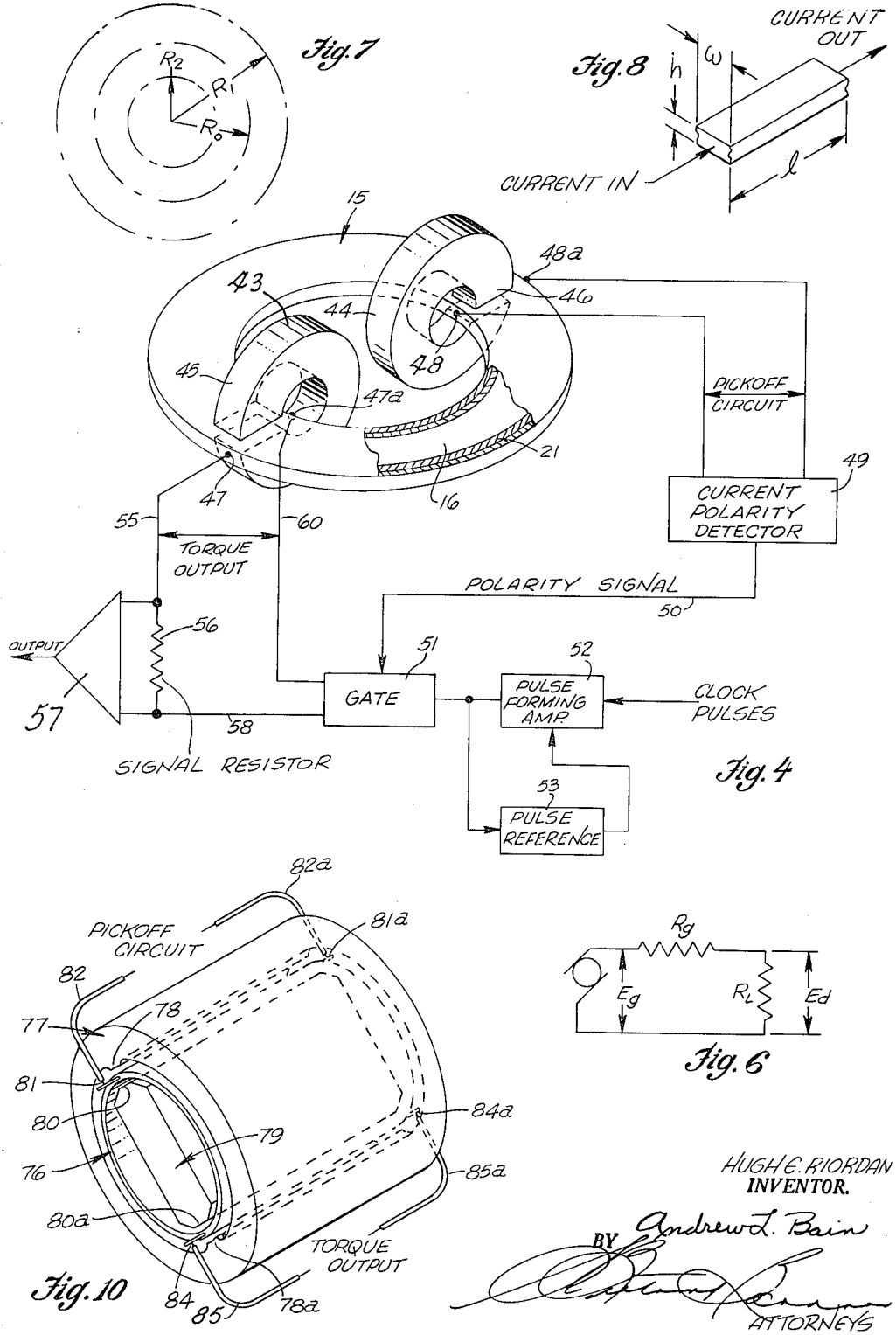

United States Patent Office 3,238,787
Patented Mar. 8, 1966

3,238,787
ANGULAR ACCELEROMETER EQUIPPED WITH MERCURY FILLED ROTOR
Hugh E. Riordan, Wyckoff, N.J., assignor to General Precision Inc., Little Falls, N.J., a corporation of Delaware
Filed Dec. 1, 1960, Ser. No. 73,139
1 Claim. (Cl. 73—516)

This invention relates to accelerometers, and is particularly directed to a light-weight, small, compact angular accelerometer, which is suitable for use in high speed aircraft, guided missiles and the like.

It is primarily directed to an accelerometer in which a shallow, hollow circular casing or disc containing a small quantity of mercury is utilized as a means for determining the angular acceleration of the casing in a plane perpendicular to the axis of rotation of the case.

Accelerometers of the type covered by this application can be utilized in control, guidance and monitoring applications.

A primary feature of the invention is that the accelerometer is small, compact, requires relatively few parts, and can be operated in any single plane in any position, as a means of determining acceleration along any axis in one plane.

The operation of the accelerometer is based on the displacement of a mercury body.

The operation of the accelerometer is based on the rotary displacement of a hollow case, or container, relative to a body or disc of mercury supported within the case, a magnetic field being provided along lines substantially parallel to the axis of rotation of the case, electrical contacts being inserted through the case, in the area of the magnetic field, so that the motion of the mercury past the magnetic field induces a potential difference between the electrical contacts, thereby indicating the degree of displacement of the mercury body relative to the hollow case.

A primary object of the invention is to provide a small, compact accelerometer which can be utilized to determine angular accelerations.

Another object is to provide an accelerometer in which a thin cylindrical body of mercury, supported in a thin hollow single or multiple housing, is utilized for determining angular accelerations in the plane in which the unit is mounted.

The accompanying drawings, illustrative of one embodiment of the invention, together with the description of its construction and method of operation, control and utilization thereof, will serve to clarify further objects and advantages of the invention.

In the drawings:

FIGURE 3 is a schematic modified perspective view of a mercury disc casing similar to that shown in FIGURE 1, and the two permanent magnets used in conjunction therewith, as well as a schematic diagram of the circuit used in conjunction therewith, representing a closed loop accelerometer.

FIGURE 4 represents a schematic perspective view, similar to FIGURE 3, of a modification of the closed loop angular accelerometer shown in FIGURE 3, which a pair of permanent magnets is used in conjunction with the mercury casing, as well as a schematic block and wiring diagram of the circuit used in conjunction with the accelerometer, to form a closed loop.

FIGURE 5 is a schematic plan view and partial section of a modification of the mercury casing, shown in FIGURES 3 and 4, showing the leakage paths of the voltage through the mercury in the casing.

FIGURE 6 is an equivalent circuit diagram of the mercury accelerometer unit shown in FIGURE 5.

FIGURE 7 is a schematic diagram of the mercury container shown in FIGURE 5.

FIGURE 8 is a schematic diagram showing the path of the voltage flow through the mercury casing, shown in FIGURE 5.

FIGURE 9 is a schematic plan view, and partial section, similar to FIGURE 5, of a modification of the mercury casing shown in FIGURE 5, the casing having an annular separater wall between the inner and outer sections thereof.

FIGURE 10 is a schematic modified perspective view of a modification of the permanent magnet, a modified mercury housing in the form of a tubular casing, and a portion of the circuitry used in conjunction therewith.

Figure 2:
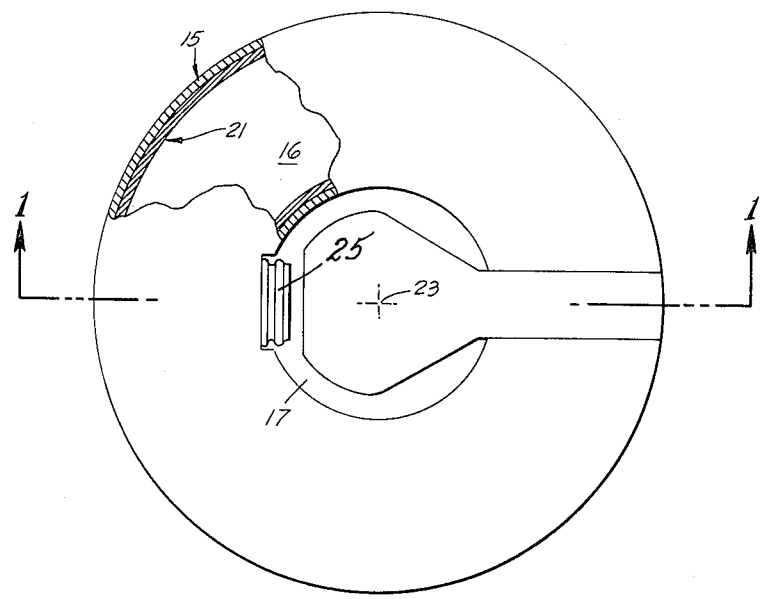
FIGURE 2 is a plan view of the permanent magnet and the mercury casing combination, shown on FIGURE 1.

It will be understood that the following description of the construction and the method of mounting, attachment, operation and utilization of the angular accelerometer fitted with mercury filled rotor, is intended as explanatory of the invention and not restrictive thereof.

In the drawings, the same reference numerals designate the same parts throughout the various views, except where otherwise indicated.

Figure 1:
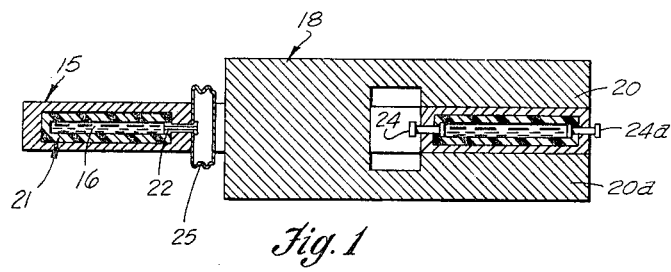
FIGURE 1 is a vertical section through the permanent magnet, shown in FIGURE 2, and the mercury casing used in conjunction with the permanent magnet, the section being taken on the line 1—1, FIGURE 2.

One embodiment of the accelerometer, shown in FIGURES 1 and 2 which is essentially the open loop type, comprises a thin, hollow annular casing 15, the casing being of circular or other suitable contour, and having a central opening 17 therethrough.

A plastic insulating inner case 21, the outer contour of which fits the interior of the casing 15, is fitted to the interior of the casing. The inner insulating case 21 is filled with mercury 16. The inner case may be made of a plastic material, a ceramic material or other suitable insulating material.

A permanent magnet 18 is mounted at one side of the mercury casing, the poles 20, 20a, of the magnet straddling the faces of the mercury casing 15.

A pair of radially positioned contacts 24, 24a is inserted through the inner and outer circumferences of the casing 15, adjacent the magnet poles, the contacts extending through the walls of the casing, so that they actually engage the mercury within the casing.

An expansible bellows 25, is mounted adjacent the inner circumferential surface of the casing 15, within a cutout therethrough. One wall of the bellows 25 is attached to the casing 15 by a hollow tubular rivet 22, or other suitable hollow connecting means, the tubular rivet fitting into the interior of the liner 21. This provides direct communication between the mercury 16 in the interior of the liner and the bellows 25. The bellows 25 are normally partially filled with mercury, or other suitable liquid. When the mercury in the casing 15 expands the excess material is transferred to the interior of the bellows.

As the mercury in the casing contracts, due to temperature changes, or other factors additional mercury is supplied through the hollow connector 22 to the interior of the casing, thereby maintaining a uniform supply of mercury within the casing.

The outer contour of the mercury housing, while shown as circular may be varied, although for accuracy it is preferable that the cross-sectional area through the mercury be constant around the entire contour.

Similarly the cross-section through the casing may be varied, the mercury filled area being either flat and substantially rectangular, as shown in FIGURE 1, or tapered, depending upon the requirements of a particular application.

For some applications, a restriction, or multiple restrictions of the mercury flow may be desirable to increase the relative velocity between the case and the mercury.

Angular acceleration, as measurable by the device results from angular acceleration of the housing, and as the mercury in the housing tends to remain relatively stationary, provides relative angular motion between the housing and the mercury.

Motion of the casing relative to the mercury located within the field casing and the consequent motion of the contacts, relative to the mercury within the casing, induces an electrical potential between the contacts 24, 24a.

This system constitutes a D.C. generator of very low source impedance, so that sizable currents can be developed if the resistance of the external circuit is kept low.

As an example:

For an apparatus having a time constant of .04 of a second, a current of .03 ampere would be attained from the following conditions:

Input acceleration—1.5 radians/sec.$^2$.
A magnetic flux density of 10,000 gauss.
An external resistance of 0.001 ohm.
The generated potential would be $3.0 \times 10^{-5}$ volts.

Simplified equations of motion are hereinafter described.

It is anticipated that an overall accuracy of the order of 0.1% should be obtainable with a device of this type.

The device should be relatively immune to shock and vibration and relatively insensitive to variation in temperature, if the resistance of the external circuit is temperature compensated. This can be done by employing a copper manganese alloy for all external conductors of the output current. Since the device has a first-order transfer function, it is relatively free of resonance effects.

In a modification of the construction, shown in FIGURE 3, two permanent magnets 26, 27, diametrically aligned with one another are utilized in conjunction with a single mercury casing 15, in place of the single magnet shown in FIGURES 1 and 2.

The poles 28, 29, of the magnets 26, 27 are located adjacent the faces of the mercury casing 15 in substantially the same manner as those shown in FIGURES 1 and 2.

A pair of contacts 30, 30a, is located adjacent the respective inner and outer circumferential surfaces of the casing 15, in substantial alignment with the poles of one permanent magnet 26 and a mating pair of contacts 31, 31a, diametrically aligned with the contacts 30, 30a, the contacts 31, 31a being aligned with the poles 29 of the opposite permanent magnet 27.

This closed loop, or nulling type of accelerometer is so constructed that a mechanical torque, generated by an amplified voltage hereinafter described, can be applied to the mercury rotor by passing a radial current through the contacts 30, 30a through the mercury filler, in the presence of the magnetic field provided by the permanent magnets 26, 27.

A device of this type should be capable of a sensitivity as high as 0.001%.

In the schematic wiring diagram shown in FIGURE 3, a voltage generated in the mercury by the magnetic flux from the poles 28, 29 of the permanent magnets is transmitted through the pick-off contacts 31, 31a.

This voltage passes through current detector 33 to a combination amplifying and shaping unit 34, from which it is transmitted to a power amplifier 35. The voltage from the power amplifier 35 is transmitted through the contacts 30, 30a in engagement with the mercury disc, the amplified voltage being adapted to generate a mechanical force in the mercury, which tends to cause the mercury filler in the casing 15, to rotate with the casing, when the filled casing is angularly accelerated.

The amplified signal voltage from the power amplifier 35 is fed to the inner contact 30a through a line 37a.

The amplified voltage leaving the mercury through the outer contact 30 is transmitted through a line 37, to a reference resistor 38. From the reference resistor, the voltage is fed to an output amplifier 39, the output from which is available at the output 40. A return line 41 connects the amplifier 39, with the reference resistor, the line closing the circuit to the power amplifier 35.

The torque output or voltage differential representing the torque available to rotate the mercury filler is determined by a line connected across the lines 37, 37a, leading to the contacts 30, 30a, which are in engagement with the mercury filler within the casing 26.

The voltage drop through the resistor 38 is proportional to the amplified current passing through the resistor 38.

The voltage drop across the resistor 38, which represents the output voltage is a measure of the torque force required to cause the mercury filler 16 to rotate with the casing 15, and is proportional to the angular acceleration of the casing 15, and therefore represents a means for measuring angular acceleration.

FIGURE 4 shows another modification of the device shown in FIGURE 3. The accelerometer construction which is of the closed loop type, is essentially the same as that shown in FIGURE 3, the difference essentially being in the wiring circuit connected to the accelerometer proper.

The wiring circuit shown in FIGURE 4, transmits a digital signal representing the acceleration, as contrasted with the analog signal transmitted by the device shown in FIGURE 3.

The two permanent magnets 43, 44 are essentially the same as those shown in FIGURE 3, except that they are inserted through the central opening through the casing, the poles 45, 46 of the magnets which are diametrically aligned with one another facing the flat faces of the mercury casing.

A pair of contacts 47, 47a, similar to those shown in FIGURE 3, is located in alignment with the pair of poles of one magnet, a mating pair of inner and outer contacts 48, 48a located adjacent the inner and outer circumferences of the casing being aligned with the poles of the opposite magnet.

The contacts 47, 48 project through the casing and directly contact the mercury filler within the casing in the same manner as those shown in FIGURE 3.

The closed loop nulling type accelerometer is essentially the same as that shown in FIGURE 3.

In the schematic wiring diagram, shown in FIGURE 4, the voltage generated in the mercury filler by the magnetic flux from the poles of the permanent magnets is transmitted through the pick-off contacts 48, 48a, to a current polarity detector 49, which serves to detect the voltage and determine the polarity thereof, the polarity signal being transmitted along a line 50 to a gate 51.

Clock pulses of constant frequency, which are generated by a computer (not shown) are transmitted to a pulse forming amplifier 52, the amplified clock pulses being transmitted to the gate 51.

The signals from the pulse forming amplifier are fed to a pulse reference mechanism 53, from which the referenced signals are fed back to the pulse forming amplifier. The pulse forming amplifier includes components which perform the following functions:

(1) A sinusoidal oscillator of basically constant frequency, which is slaved to the clock pulse repetition frequency.

(2) A variable gain amplifier which changes its gain in response to a voltage or current command furnished by the pulse reference.

(3) A half-wave rectifier.

These three functions are performed by circuits of substantially conventional design for the specified purposes. They are connected in cascade in the sequence listed and function as follows:

The oscillator produces a constant frequency sinusoidal signal, which is fed to the variable gain amplifier where the power level is raised to the value necessary to feed the torquer contacts 47, 47a.

The amplifier output is fed to the half-wave rectifier which produces an output consisting of a train of sinusoidal pulses of constant polarity and repetition frequency.

The pulse reference senses the average impulse content of the pulses and produces a command signal which increases the gain of the variable gain amplifier if the impulse content is too low and reduces the gain if the impulse content is too high. The result is therefore to assure that the average impulse content of the pulses leaving the rectifier circuit is constant.

The pulse reference 53 consists of an imperfect integrator of long time constant and a source of accurate reference voltage. The pulse voltage is integrated (or averaged) so that there results a voltage which is proportional to the integral of the pulse voltage divided by time.

The voltage is therefore proportional to the average impulse content of the pulses. This voltage is compared with the reference voltage and the resultant inner signal applied as the command to the variable gain amplifier.

The gate circuit 51, shown in FIGURE 4 contains two sections. One section consists of a gate which passes positive pulses in response to a positive command signal from the polarity detector, and passes no pulse when a negative command or no command, is received from the current polarity detector 49.

The other section inverts the positive pulses and passes them (as negative pulses) when a negative command signal is received from the polarity detector, and passes no pulses when a positive signal or no signal is received from the polarity detector.

The amplified signals from gate 51 are transmitted through the contacts 47, 47a in engagement with the mercury filler 16, the amplified signal being adapted to generate a mechanical force in the mercury filler, which tends to cause the mercury filler in the casing to rotate with the casing in the same manner as that shown in FIGURE 3, when the casing is angularly accelerated.

The amplified signal through the outer contact 47 is transmitted through a line 55, to a reference resistor 56. The signal voltage across the reference resistor 56 is fed to an output amplifier collector 57, from which it goes to digital computer (not shown).

A return line 58, connects the amplifier and reference resistor 56 with the gate 51.

In order to obtain a torque output signal from the mercury filler, lines are connected across the two lines 55 and 60 leading to the contacts 47, 47a, connected to the inner and outer circumference of the mercury filler in the casing, respectively.

The voltage differential between the two lines 55, 60 leading to the contacts 47, 47a is a measure of the torque force required to cause the mercury filler to rotate with the casing 15, and is proportional to the angular acceleration of the casing and therefore provides a means for measuring angular acceleration.

This output voltage differential across the resistor 56 is controlled by the timing pulses from the amplifier 52, provide a digital signal which also represents the torque force required to cause the mercury filler to rotate with the casing.

These digital signals are proportional to the angular acceleration of the casing and therefore represent a digital means for measuring the angular acceleration and transmitting the angular acceleration in the form of digital code pulses to a digital computer.

FIGURE 5 is a schematic plan view of a rotor casing 61, similar to those shown in FIGURE 2, 3 and 4, showing the leakage paths of the voltage through the mercury filler 62 in the interior of the casing.

A plastic insulating inner case 59, similar to that shown in FIGURE 1, is fitted to the interior of the casing 61, the mercury filler 62 filling the interior of the inner case 59.

The inner case may be made of a plastic, ceramic or other suitable insulating material.

The rectangular areas at the upper and lower ends of FIGURE 5, show the areas 63, 63a, normally in engagement with the poles of the permanent magnet such as that shown in FIGURE 1 and 2.

In the open loop casing construction shown in FIGURE 5, the leakage paths in the area adjacent the magnet poles follow relatively short arcuate paths 64, 64a. In the balance of the casing, the leakage paths of the voltage through the mercury follow relatively long arcuate paths 65, 65a, each of which extends from a point close to the upper magnetic pole area 63a, to an arcuate end, which is located a short distance from the lower magnetic pole area 63.

FIGURE 6 shows the equivalent electrical circuit of the mercury rotor accelerometer, such as that shown in FIGURES 2 and 5.

In this circuit:

$R_g$ is the resistance of the current path under the magnet pole areas 63, 63a.

$R_L$ is the effective resistance of the current leakage paths through the portions of the mercury not in the magnetic circuit, such as those shown at 65, 65a, FIGURE 5.

Since the effective output voltage through the pickoff contacts 66, 66a is given by:

$$E_o = \frac{E_g R_L}{R_L + R_g}$$

It is desirable that $R_L$, the resistance through the leakage paths, be as large as possible compared with $R_g$. The resistance of any path through the mercury is given by:

$$R = \frac{\rho l}{hw}$$

where $\rho$ is the resistivity of murcury, and $h$, $w$ and $l$ are the dimensions of the current path through the mercury, as shown in FIGURE 8.

By adding an annular separator ring 68 between the inner and outer walls of the mercury casing 69, as shown in FIGURE 9, the mercury filler is divided into two concentric sections 70, 70a.

A pair of plastic insulator cases 73, 73a is fitted to the interior of the casing 69. The annular inner and outer walls 75, 75a, of the insulator cases 73, 73a respectively adjoin the inner and outer surfaces of the separator ring 68.

The mercury filler sections 70, 70a fill the interior of the two insulator cases.

In this construction, the effective width of the return path 71, 71a is reduced due to the reduced radial width of each section of the casing, the leakage paths 71, 71a following substantially the arcuate paths shown in FIGURE 9.

The overall length of the return paths 71, 71a is increased, due to the fact that two return paths 71, 71a are substituted for the individual return path 65 shown in FIGURE 5.

The magnet pole engagement areas 72, 72a in this construction are substantially the same as those shown in FIGURE 5.

In this construction, the leakage paths 74, 74a in the areas adjacent the magnet pole contact areas follow the shorter arcuate paths, shown in FIGURE 9, two individual paths being substituted for the one continuous path 64, shown in FIGURE 5.

FIGURE 7 is a schematic diagram of the casing shown in FIGURE 5, $R_1$, $R_2$ and $R_0$ representing, respectively, the outer wall, inner wall, and mean radii of casing 61.

In the construction shown in FIGURES 5 and 7, the length of the current leakage paths 65, 65a range from $R_1-R_2$, the radial distance between the inner and outer walls of the casing to approximately $R_1-R_2+R_0$.

With the addition of the intermediate annular separator ring 68 shown in FIGURE 9, the minimum length of the leakage paths is significantly increased, due to the fact, that there are two pairs of leakage paths 71, 71a, as contrasted with the single pair 65, shown in FIGURE 5.

The effective path width of each of the leakage paths shown in FIGURE 7, is also sharply reduced, due to the narrower radial length of the mercury spaces shown in FIGURE 9, over that shown in FIGURE 5.

The use of an annular separator wall applies equally, whether the basic configuration of the mercury rotor is a hollow cylinder, such as that shown in FIGURE 10, or a relatively flat circular disc, such as these shown in FIGURES 5 and 9.

FIGURE 10 shows another modification of the accelerometer construction shown in FIGURES 3 and 4.

In this construction, a hollow tubular mercury casing 76 is provided, the annular area between the circumferential inner and outer walls thereof being filled with mercury.

A hollow tubular permanent magnet 77, concentric with the tubular casing surrounds the outer circumference of the casing, the permanent magnet having a pair of diametrically opposed poles 78, 78a, the poles being spacedly located relative to the mercury casing to provide an air gap between the poles and the casing.

A pole piece 79, having parallel faces extends over the length of the tubular casing 76, co-axially therewith, the ends of the pole pieces, along a substantially vertical axis being of substantially trapezoidal cross-section, and terminating in a pair of poles 80, 80a, which are spacedly located relative to the inner surface of the casing 76 and normally diametrically aligned with the poles 78, 78a of the permanent magnet.

A pair of contacts 81, 81a is fitted to the ends of the casing in nominal radial alignment with one of the poles 78, 78a of the magnet, the contacts extending through the end walls of the casing and being in direct engagement with the mercury filler in the casing. These contacts are connected by lines 82, 82a representing the pick-off circuit, which functions in a manner similar to the lines shown at the right-hand side of FIGURE 3, leading from the contacts 31, 31a to the current detector 33.

Another pair of contacts 84, 84a, diametrically aligned with the contacts 81, 81a, is fitted to the ends of the casing 76, the contacts being in nominal radial alignment with the opposite pole 78a of the permanent magnet 77. These contacts are constructed and function in the same manner as the contacts 30, 30a in (FIGURE 3) engaging the mercury filler 16, shown in FIGURE 3.

These contacts 84, 84a are connected by torque output lines 85, 85a, which are similar to the lines 37 and 37a shown in FIGURE 3, which lead to the output resistor 38 shown in FIGURE 3, and the amplifier 35, respectively.

When the lines 82, 82a and 85, 85a are connected to a wiring circuit, such as that shown in FIGURE 3, they provide an analog signal through the output 40 the same as that shown in FIGURE 3.

When the lines 82, 82a and 85, 85a are connected to a wiring circuit, such as that shown in FIGURE 4, they provide digital signals through the output amplifier 57, in the same manner as the apparatus shown in FIGURE 4.

The operation of the accelerometer shown in FIGURE 10, is substantially the same as those shown in FIGURES 3 and 4, except for the cross-sectional contour of the mercury casing 76 and the mercury filler thereof.

The device is of the closed loop type, similar to those shown in FIGURE 3 and 4.

In this construction, a mechanical torque generated by amplified voltage fed through the contacts 84, 84a is applied to the mercury rotor, to cause the mercury filler to follow the rotational angular movement of the tubular casing 76.

The magnetic lines of force fed from the poles 78, 78a of the permanent magnet through the mercury casing to the pole piece 79 are essentially the same as those in FIGURES 3 and 4, except that they pass radially through the tubular casing 76 and the mercury filling fitted thereto.

In all other respects, this device is essentially the same as those shown in FIGURE 3 and 4.

The tubular casing 76 has a plastic or other type of insulating liner fitted thereto, in the same manner, as those shown in FIGURES 1 and 3.

The following is an analyses of the operation of the open-loop mercury rotor construction, shown in FIGURES 1 and 2.

Assuming:

$\theta$ = Mercury rotor angle.
$x$ = Case angle.
$C$ = Total effective damping co-efficient including electromagnetic damping.
$J$ = Moment of inertia of the mercury rotor 16.
$E_o$ = Output voltage.
$I_o$ = Output current.

In order to simplify the analysis, the assumption is made that except for the viscous drag, the mercury filler acts like a rigid body.

The basic equations of the apparatus are:

$$J\ddot{\theta}=C(\dot{x}-\dot{\theta}) \quad (1)$$

$$E_o=K_1(\dot{x}-\dot{\theta}) \quad (2)$$

$$I_o=\frac{E_o}{R} \quad (3)$$

These equations can be reduced to the operational form.

$$I_o=\frac{\frac{K_1}{R}J\ddot{x}}{Js+C}=\frac{\frac{K_1}{R}\tau\ddot{x}}{\tau s+1} \quad \text{where} \quad \tau=\frac{J}{C} \quad (4)$$

This is a first order transfer function; hence there is no resonance produced by the instrument in operation.

In the closed-loop mercury rotor shown in FIGURES 3 and 4, again assuming a rigid mercury rotor, and using the same notations hereinbefore used.

Assuming that the mercury body is constrained to take the form of a hollow cylindrical shell of which:

$R_0$ = The mean radius of the shell.
$l$ = Axial length of the shell.
$h$ = Thickness of the shell.
$J$ = Moment of inertia of shell.
$c$ = Viscous damping co-efficient.

The differential equation of motion is:

$$J\ddot{\theta}=c(\dot{x}-\dot{\theta})+K_1I_1 \quad (5)$$

$$K_1=\frac{BlR_0}{10} \quad (6)$$

in which B = flux density across the mercury.

If an amplifier of current gain $K_3$ is connected between the amplifier and pick-off shown in FIGURE 3 so that $K_1I_1$, is in a restoring sense, then:

$$I_1=-K_2K_3(\theta-\dot{x}) \quad (7)$$

Where:

$$K_2=BlR\times 10^{-8} \quad (8)$$

Combining Equations 5 and 7 and using operational notation:

$$I_1=\frac{\ddot{x}\tau K_2K_3}{\tau s+1} \quad (9)$$

$\tau$ = time constant

Where $$\tau = \frac{J}{c + K_1 K_2 K_3} \quad (10)$$

Applying the final value theorem to Equation 5 yields the steady state sensitivity as:

$$\frac{I_{1ss}}{\ddot{x}_{ss}} = K_2 K_3 \tau \quad (11)$$

for a large $K_2 K_3$ and where the density of the fluid $= \gamma$ $$K_2 K_3 \tau \approx \frac{J}{K_1} = \frac{10 J}{BlR} = \frac{10(2\pi\gamma hlR^3)}{BlR} = \frac{20\pi\gamma hR^2}{B} \quad (12)$$

$$\tau \approx \frac{J}{K_1 K_2 K_3} = \frac{20\pi\gamma hlR^3}{(BlR)^2 \times 10^{-8} K_3} = \frac{2\pi\gamma hR \times 10^9}{K_3 B^2 l} \quad (13)$$

The stability function is $$\frac{\theta}{x} = \frac{c + \frac{K_1 K_2 K_3}{R}}{Js + \left(c + \frac{K_1 K_2 K_3}{R}\right)}$$

and the output function is:

$$I_2 = \frac{\frac{K_1 K_2}{R} J \ddot{x}}{Js + \left(c + \frac{K_1 K_2 K_3}{R}\right)} = \frac{\frac{K_1 K_3}{R} \tau \ddot{x}}{\tau s + 1}$$

Where $$\tau = \frac{J}{c + \frac{K_1 K_2 K_3}{R}}$$

This is also a first order function, so that there is no resonance produced by the device.

It will be apparent to those skilled in the art, that the present invention is not limited to the specific details described above and shown in the drawings, and that various modifications are possible in carrying out the features of the invention and the operation, circuitry, and the method of support, mounting, adjustment and utilization thereof, without departing from the spirit and scope of the appended claim.

What is claimed is:

An angular accelerometer comprising:
hollow casing means defining an annular chamber having electrically non-conductive bounding surfaces, the cross-section of said chamber having a thickness dimension which is very small in comparison to its width;
an expansible reservoir chamber mounted on said casing means in flow communication with said annular chamber;
a quantity of conductive liquid completely filling said annular chamber and reservoir chamber;
permanent magnet means mounted on said casing means and having magnetic poles transmitting a magnetic flux field transversely through said annular chamber in the thickness direction and through the mercury therein;
electrically conductive terminal members projecting into said chamber and contacting said liquid at spaced points in a plane transversely intersecting said flux field;
wall means, with non-conductive surfaces, disposed within said annular chamber and subdividing said annular chamber into a plurality of adjoining annular compartments, the dimension of each compartment measured along a line between said spaced points being a fraction of the corresponding dimension of the chamber.

References Cited by the Examiner

UNITED STATES PATENTS

| | | | |
|---|---|---|---|
| 2,225,716 | 12/1940 | Sexton | 73—516 |
| 2,753,469 | 7/1956 | Statham et al. | 73—516 |
| 2,869,851 | 1/1959 | Sedgfield et al. | 73—517 |
| 2,936,711 | 5/1960 | Watt | 74—5.7 X |
| 2,942,476 | 6/1960 | Turner | 73—517 |
| 2,943,493 | 7/1960 | Ten Bosch et al. | 73—516 |
| 2,949,784 | 8/1960 | Maeder | 74—5.7 |
| 2,953,925 | 9/1960 | Yeadon | 74—5.7 |
| 2,975,641 | 3/1961 | Lees | 73—516 |
| 2,983,149 | 5/1961 | Lees | 73—516 X |
| 2,988,737 | 6/1961 | Schroeder | 73—517 |
| 3,028,550 | 4/1962 | Naydan | 73—517 |
| 3,045,599 | 7/1962 | Carlson | 310—11 |
| 3,081,637 | 3/1963 | Gevas | 73—517 |
| 3,098,393 | 7/1963 | Cook | 73—516 |

FOREIGN PATENTS 708,228  4/1954  Great Britain.

RICHARD C. QUEISSER, *Primary Examiner.*

A. BLUM, JAMES J. GILL, S. FEINBERG, JOSEPH P. STRIZAK, *Examiners.*

L. L. HALLACHER, *Assistant Examiner.*